Figure 1:
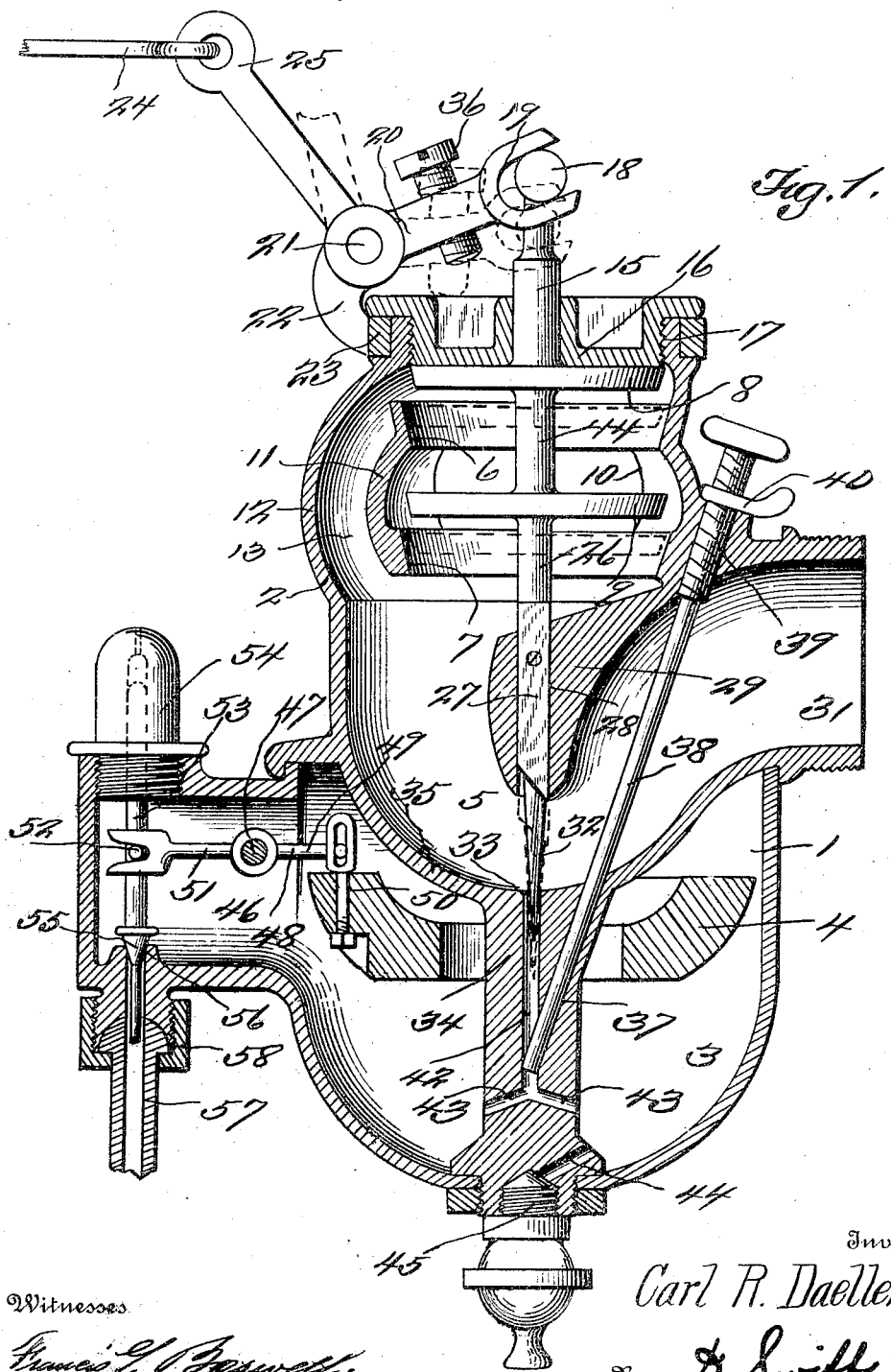

C. R. DAELLENBACH.
CARBURETER.
APPLICATION FILED JAN. 27, 1912.

1,053,136.

Patented Feb. 11, 1913.
2 SHEETS—SHEET 1.

Witnesses

Inventor
Carl R. Daellenbach,
By D. Swift &C.
Attorneys

C. R. DAELLENBACH.
CARBURETER.
APPLICATION FILED JAN. 27, 1912.
1,053,136.
Patented Feb. 11, 1913.
2 SHEETS—SHEET 2.
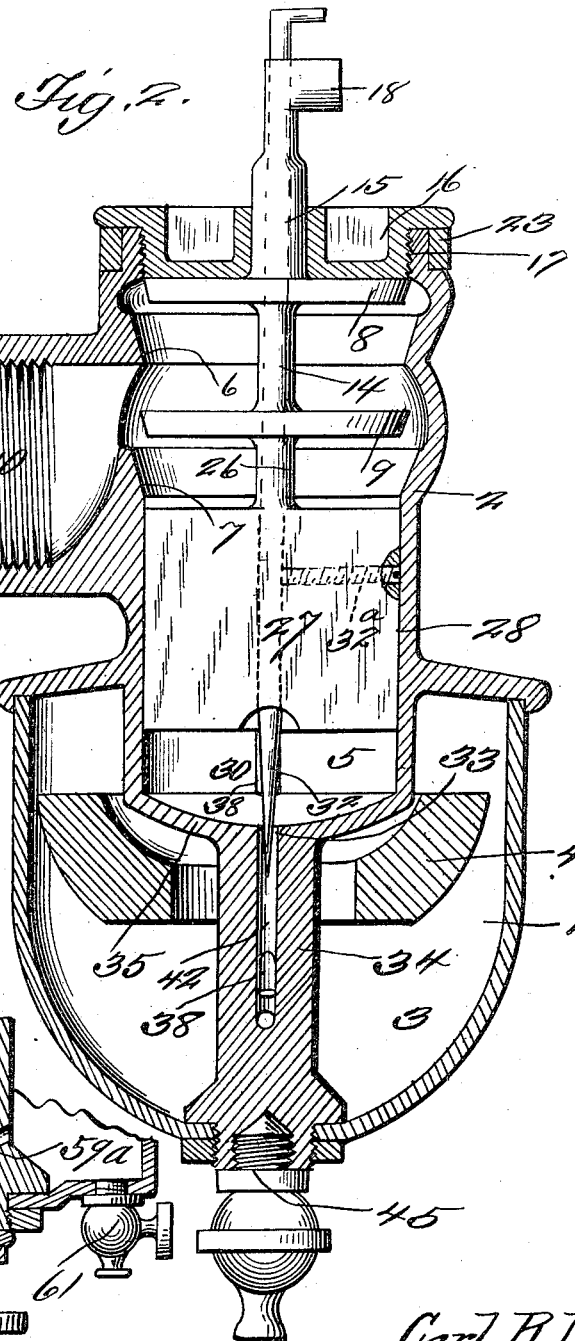
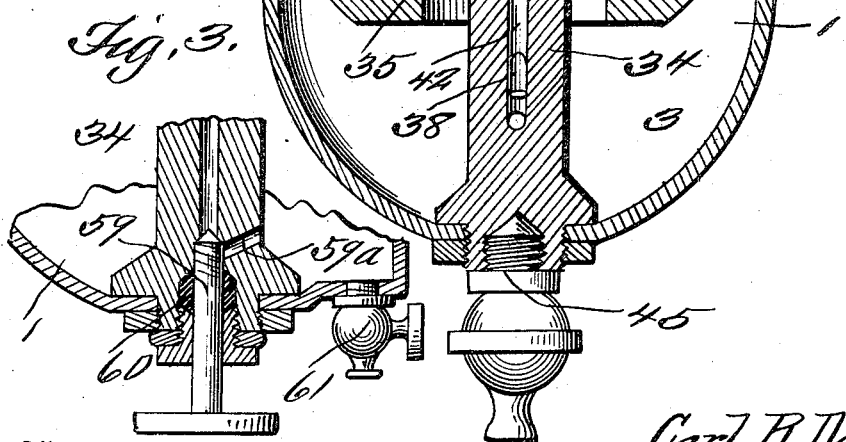

UNITED STATES PATENT OFFICE.

CARL R. DAELLENBACH, OF ELLWOOD CITY, PENNSYLVANIA.

CARBURETER.

1,053,136.

Specification of Letters Patent.

Patented Feb. 11, 1913.

Application filed January 27, 1912. Serial No. 673,897.

*To all whom it may concern:*

Be it known that I, CARL R. DAELLENBACH, a citizen of the United States, residing at Ellwood City, in the county of Lawrence and State of Pennsylvania, have invented a new and useful Carbureter; and I do hereby declare the following to be a full, clear, and exact description of the invention, such as will enable others skilled in the art to which it appertains to make and use the same.

This invention relates to a new and useful carbureter, adapted mainly for use in connection with gas engines.

The primary object of the invention is to improve the general construction of carbureters, thereby producing a simple and much more efficient and practical carbureter, and one which will positively control the air and gasolene, and mix them in proper ratio at all times, whether the throttle be fully or partly opened, when controlling the speed of the engine.

Another object is to produce an improved carbureter of such a design that, as the air leaves the spraying nozzle at a high speed or force it will convey all the gasolene with it, and at the same time create a suction strong enough to draw the gasolene into the air passage, at such a speed as to atomize it and thoroughly carburet the passing air.

In the drawings certain features are disclosed, but in practical fields these features may meet with alterations, to which the patentee is entitled provided the alterations are comprehended within the scope of what is claimed.

The invention comprises further features and combination of parts, as hereinafter set forth, shown in the drawings and claimed.

In the drawings: Figure 1 is a vertical sectional view through the improved carbureter constructed in accordance with the invention. Fig. 2 is a sectional view on line 2—2 of Fig. 1. Fig. 3 is a detail view showing a modified construction of a portion of the carbureter.

Referring more particularly to the drawings 1 designates the lower portion of the casing of the carbureter, the lower end of which is globular while 2 designates the upper portion thereof. The lower globular portion has a float chamber 3, in which the annular ring float 4 is arranged, while in the upper portion the carbureting chamber 5 is formed. Upon the interior of the chamber 5 a pair of valve seats 6 and 7 are formed, with which the disk valves 8 and 9 coact, so as to control the carbureted mixture, as it leaves the outlet 10, on its way to the combustion engine. Extending from the chamber 5 between the walls 11 and 12 is a passage 13, which will also permit the carbureted mixture to pass the disk valve 8. The disk valves 8 and 9 are connected by a stem 14, so that the two will move together and as one body. An extension 15 extends upwardly from the valve 8, and through the head 16 of the carbureter. This head 16 is threaded into the casing of the carbureter, as shown at 17. The upper end of the extension 15 is formed with an offset 18 with which the bifurcated end 19 of the bell crank lever 20 coöperates. This bifurcated end and offset 18 and 19 constitute a knuckle joint between the extension 15 and the lever 20. This lever 20 is pivoted at 21 to an extension 22, of an annular slip ring 23 on the upper end of the casing. A rod or the like 24 is connected to the end 25 of the lever 20. When the lever 20 is rocked upon its pivot 21, the valves 8 and 9 throttle their valve seats, thus controlling the carbureted mixture.

Projecting downwardly from the disk valve 9 is an extension 26, which terminates in a slide gate 27, which operates and is guided in the guide 28. This guide is formed in an enlarged interior wall 29 of the chamber 5. The wall 29 extends downwardly substantially two-thirds the depth of the chamber 5, thus forming a gateway 30. The air passing through the passage 31 is controlled at the gateway 30 by means of the gate 27.

Passing through the extension 15, the stem 14, and the extension 26, and adapted to project downwardly from the lower edge of the gate 27 is a needle valve 32 (which is held in adjusted positions by the screw 32ª shown in Fig. 2), which coöperates with the valve seat 33 formed in extension 34 of the bowl shaped wall 35, which divides the float chamber from the carbureting chamber. The needle valve 32 controls the intake of gasolene into the carbureting chamber 5, it depending upon the position of the gate 27. In other words if the gate 27 is entirely raised, a large supply of gasolene will be drawn into the carbureting chamber 5 by the force of the incoming air in the passage 31, in which case heavy charges of carbureted mixture will be forced into the engine (not shown) thereby running the same at a great rate of speed. If, however, the lever 20 is arranged as shown in dotted lines in Fig. 1, the same being limited in such position by the screw 36, thereby disposing the gate 27 in the position shown in dotted lines in Fig. 1, a very small charge of carbureted mixture will be permitted to pass through the chamber 5 and thence to the engine.

Extending angularly through the extension 34 is a needle valve seat 37, with which the needle valve 38 coöperates. This needle valve is threaded into the casing 1 as shown at 39, there being a suitable lock nut for holding the same in adjusted positions. This lock nut is designated by the numeral 40. The needle valve 38 constitutes means for manually regulating the intake of gasolene into the chamber 5.

Communicating with the passage way 42 in the extension 34 are two passage ways 43, through which the gasolene feeds from the chamber 1. A duct 44 is formed in the lower portion of the extension 34. A plug 45 threaded into the extension 34 closes the duct 44. By removing the plug 45, sediment in the lower portion of the float chamber may be removed by way of the duct 44.

Extending laterally of the casing 1 is a supplemental casing 46, transversely of which a rod 47 extends. Pivoted upon the rod 47 is a rock lever 48, one arm 49 of which is connected to the float 4 by the screw 50, while the other arm 51 is provided with a knuckle joint 52 engaging the vertically movable valve rod 53, the upper end of which is guided in a plug 54, while the lower portion terminates in a needle valve 55, designed to coöperate with the seat 56 which is formed in the supplemental casing 46. The usual form of connecting pipe 57 from a gasolene reservoir or tank (not shown) is connected to the supplemental casing 46 by the nut 58. As the gasolene in the float chamber lowers, the float 4 descends, thus causing the lever 48 to rock upon its pivot rod 47, thereby unseating the needle valve 55. As the gasolene increases in the float chamber, the float rises, which in turn closes the valve 55.

In Fig. 3 a different form of manually manipulated needle valve is provided, for controlling the intake of gasolene from the float chamber. This needle valve in Fig. 3 is designated by the numeral 59, located in the lower end of the extension 34, and extending upwardly thereinto. The needle valve 59 extends through a packing gland 60. In Fig. 3 a valve cock 61 located to one side of the needle valve 59 is threaded in the lower portion of the casing 1, for drawing off the sediment.

The invention having been set forth, what is claimed as new and useful is:—

1. In a carbureter, a casing having a float chamber adapted to contain gasolene and provided with a carbureting chamber, the bottom wall of the carbureting chamber having an extension with a passage way therein communicating with the float chamber, a guide way in the carbureting chamber, a gate mounted in the guide and provided with a needle valve for extending through the upper end of the passage way of the extension for closing the same, the gate and needle valve constituting means for simultaneously controlling the intake of air and gasolene, and means operated simultaneously with the gate for controlling the delivery of the carbureted mixture into an engine.

2. In a carbureter, a casing having a float chamber adapted to contain gasolene and provided with a carbureting chamber, the bottom wall of the carbureting chamber having an extension with a passage way therein communicating with the float chamber, a guide way in the carbureting chamber, a gate mounted in the guide and provided with a needle valve for extending through the upper end of the passage way of the extension for closing the same, the gate and needle valve constituting means for simultaneously controlling the intake of air and gasolene, means operated simultaneously with the gate for controlling the delivery of the carbureted mixture into an engine, a mechanism for simultaneously operating said means, the gate and the needle valve, all as one body, and means for holding the needle valve in adjusted positions relative to the gate.

3. In a carbureter, a casing having a float chamber adapted to contain gasolene and provided with a carbureting chamber, the bottom wall of the carbureting chamber having an extension with a passage way therein communicating with the float chamber, a guide way in the carbureting chamber, a gate mounted in the guide and provided with a needle valve for extending through the upper end of the passage way of the extension for closing the same, the gate and needle valve constituting means for simultaneously controlling the intake of air and gasolene, means operated simultaneously with the gate for controlling the delivery of the carbureted mixture into an engine, a mechanism for simultaneously operating said means, the gate and the needle valve, all as one body, and means manually regulated for controlling the intake of gasolene.

4. In a carbureter, a casing having a float chamber adapted to contain gasolene and provided with a carbureting chamber, the bottom wall of the carbureting chamber having an extension with a passage way therein communicating with the float chamber, a guide way in the carbureting chamber, a gate mounted in the guide and provided with a needle valve adjustable through it, the needle valve extending through the upper end of the passage way of the extension for closing the same, the gate and needle valve constituting means for simultaneously controlling the intake of air and gasolene, a float mechanism for automatically controlling the level of the gasolene in the float chamber, means passing through the gate for holding the needle valve in adjusted positions relative to the gate, and a needle valve manually regulated for controlling the intake of gasolene.

5. In a carbureter, a casing having a float chamber adapted to contain gasolene and provided with a carbureting chamber the bottom wall of the carbureting chamber having an extension with a passage way therein communicating with the float chamber, a guide way in the carbureting chamber, a gate mounted in the guide and provided with a needle valve adjustable through it, the needle valve extending through the upper end of the passage way of the extension for closing the same, the gate and needle valve constituting means for simultaneously controlling the intake of air and gasolene, the casing having a pair of valve seats in its upper portion, the gate having a pair of disk valves carried thereabove to coöperate with the valve seats for simultaneously controlling the delivery of the carbureted mixture to an engine, a float mechanism for automatically controlling the level of the gasolene in the float chamber, and means carried by the gate for holding the needle valve in adjusted positions relative to the gate.

6. In a carbureter, a casing having a carbureting chamber and a gasolene chamber, and a connecting passage between the two chambers, a gate operable in the carbureting chamber for controlling the intake of air and provided with a valve member adjustable through it and operable in the passageway to control the intake of gasolene, and means for holding the valve member adjustable relative to the gate.

In testimony whereof I have signed my name to this specification in the presence of two subscribing witnesses.

CARL R. DAELLENBACH.

Witnesses:
  Geo. F. Douds,
  Susie Wilson.

Copies of this patent may be obtained for five cents each, by addressing the "Commissioner of Patents, Washington, D. C."